Aug. 20, 1963
H. J. KRATT
3,100,955
APPARATUS FOR PRODUCING CONTACT LENSES
Filed April 25, 1960
3 Sheets-Sheet 1
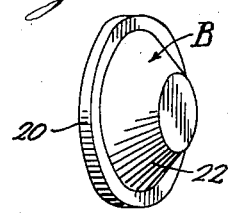
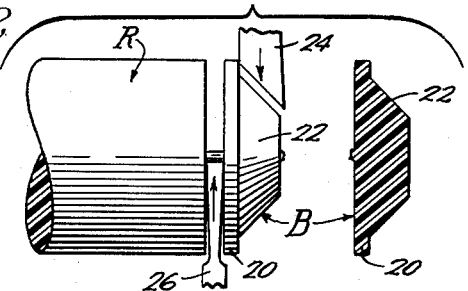
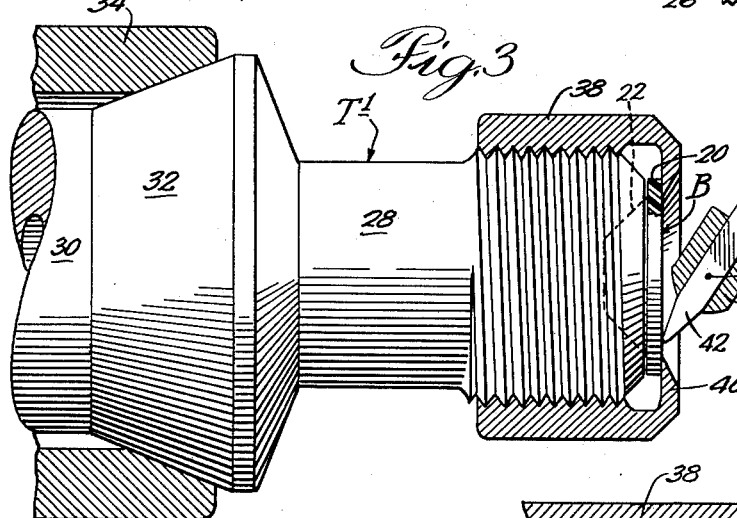
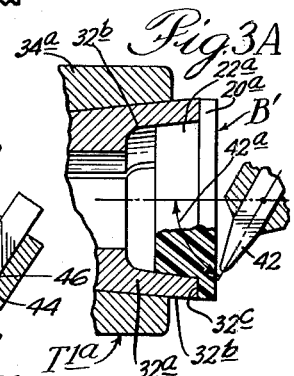
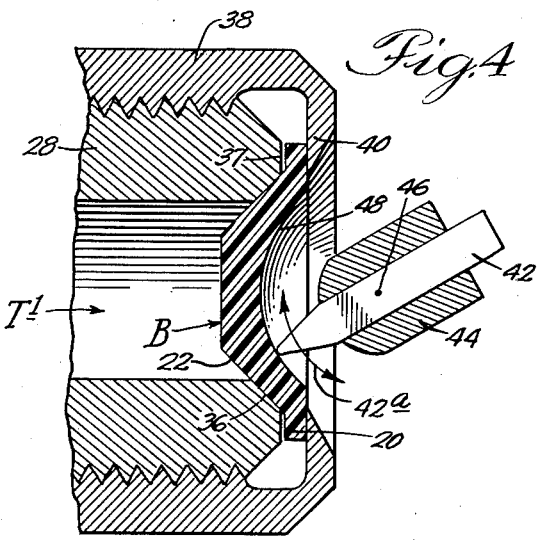
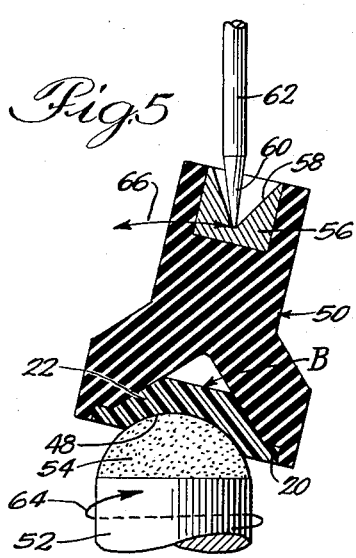
INVENTOR:
Henry J. Kratt,
BY Bair, Freeman & Molinare
ATTORNEYS.

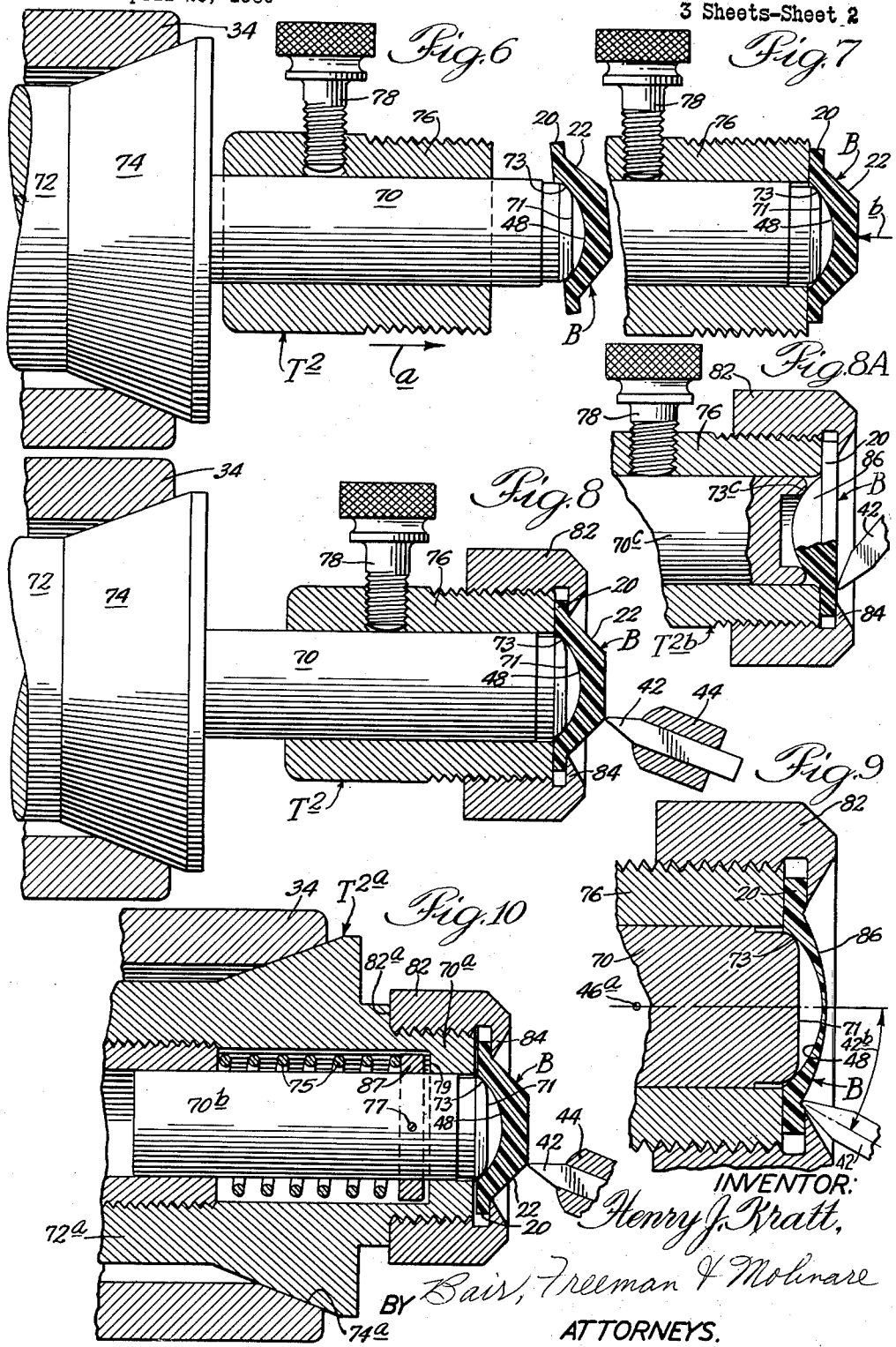

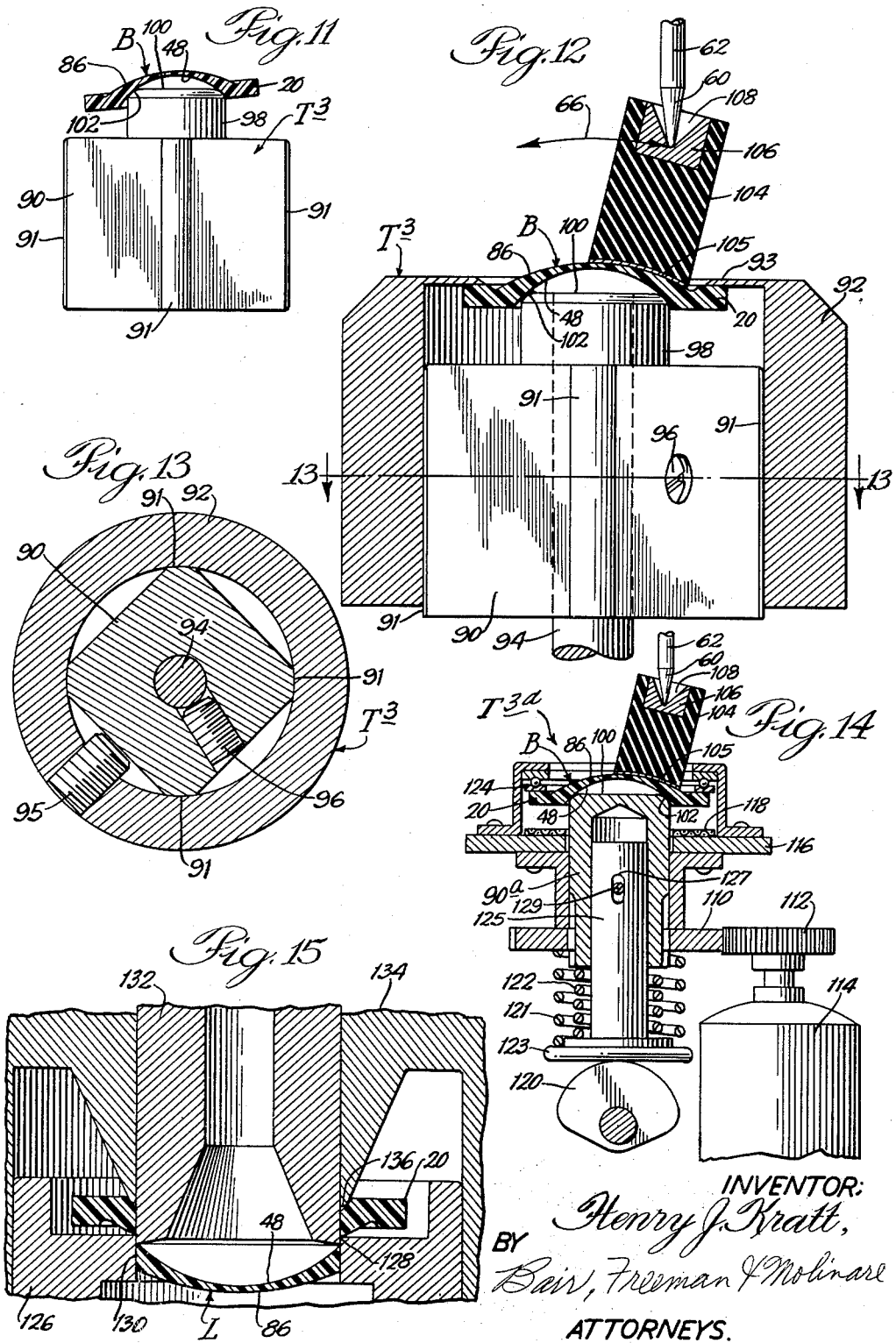

United States Patent Office 3,100,955
Patented Aug. 20, 1963

3,100,955
APPARATUS FOR PRODUCING CONTACT LENSES
Henry J. Kratt, Chicago, Ill., assignor to The Plastic Contact Lens Company, Chicago, Ill., a corporation of Illinois
Filed Apr. 25, 1960, Ser. No. 24,473
10 Claims. (Cl. 51—217)

This invention relates to contact lenses and apparatus for producing them.

One object of the invention is to provide apparatus that eliminates all possibility of prism in a contact lens produced by using my apparatus.

Another object is to provide an apparatus for producing contact lenses which maintains throughout the various operations from lens blank to near-finished lens an orientation flange around the lens, at least one surface of which provides a reference plane normal to the optical axis of the lens and cooperates with a plane surface of each of the various tools constituting my apparatus which are likewise normal to the axes of rotation of the tools, thereby insuring that both the base curve and the power curve of the lens will be properly related to the optical axis of the lens, both during cutting of these surfaces and during the polishing thereof.

Still another object is to provide apparatus for cutting the base curve in a flanged lens blank while holding it in a holding tool with predetermined alignment of the flange with the axis of rotation of the tool, a flange-engaging sleeve being used for this purpose, after which the base curve is polished, and also cutting the power curve while the lens blank is in a second holding tool with the flange of the blank again held accurately in a plane normal to the axis of rotation of the tool by a second flange-engaging sleeve, and finally polishing the power curve while the lens is held optically true with relation to a third lens holding tool by reason of the flange of the lens blank being held normal to the axis of rotation of the third holding tool by a flange-engaging weight.

A further object is to provide the first lens blank holding tool with a cone-shaped socket for a cone-shaped projection of a contact lens blank to seat against, a flange-engaging sleeve being telescopically movable on the tool and having a flange to engage the flange of the lens blank with the plane of engagement accurately normal to the plane of rotation of the tool, whereupon the base curve may be cut in the lens blank.

Still a further object is to provide a second lens blank holding tool having a stem with a rounded edge at one end to engage the base curve of a lens blank, a flange-engaging sleeve telescopically slidable on the stem to contact one face of the flange of the blank and a second sleeve telescopically movable relative to the first sleeve and the stem to engage the opposite face of the flange of the blank whereby the blank flange is again accurately held normal to the axis of rotation by reason of the engaging surfaces of the two sleeves formed normal to the axis of rotation of the second holding tool whereupon the power curve may be cut on the lens blank.

An additional object is to provide a third lens blank holding tool having a stem provided with a rounded edge at its end to again contact the base curve of the lens blank and a weighted sleeve telescopically slidable on the third lens holding tool and having a blank flange-engaging surface normal to the axis of rotation of the third tool to hold the lens blank optically aligned with the third holding tool while it rotates and during the polishing operation for the power curve of the lens blank, after which the flange of the blank may be discarded and the edge of the remaining lens suitably finished.

With these and other objects in view, my invention consists in the construction, arrangement and combination of the various parts of my apparatus for producing contact lenses, whereby the objects above contemplated are attained, as hereinafter more fully set forth, pointed out in my claims and illustrated in detail on the accompanying drawings, wherein:

FIG. 1 is an enlarged perspective view of a contact lens blank used with my apparatus for producing contact lenses;

FIG. 2 is a part plan, part sectional view of a lens blank being formed from a rod of methyl methacrylate or the like, and a cross section of the blank cut therefrom;

FIG. 3 is a part plan, part sectional view of a first lens blank holding tool for the lens blank and a cutting tool in position for cutting a base curve therein;

FIG. 3A is a similar view showing a modification;

FIG. 4 is a further enlarged sectional view of a portion of FIG. 3 showing the base curve being cut;

FIG. 5 is a vertical cross sectional view (same scale as FIGS. 1, 2 and 3) through a polishing holder and a lens blank after the base curve has been cut as in FIG. 4, together with polishing apparatus associated therewith, for polishing the base curve of the lens;

FIG. 6 is a part sectional, part plan view of a second lens blank holding tool;

FIGS. 7 and 8 are further views similar thereto illustrating certain steps in adjusting the parts of the second holding tool to cooperate with the lens;

FIG. 8A is a view similar to FIG. 8 showing a modification;

FIG. 9 is a sectional view (same scale as FIG. 4) showing a portion of FIG. 8 and the power curve being cut on the lens blank;

FIG. 10 is a sectional view of a modified form of the second lens blank holding tool shown in FIGS. 6, 7, 8 and 9;

FIG. 11 is a side elevation of a third lens blank holding tool and the lens blank positioned thereon;

FIG. 12 is a similar sectional view (same scale as FIGS. 4 and 9) showing a weighted sleeve associated therewith for holding the lens blank in optically aligned position during the polishing of the power curve of the blank;

FIG. 13 is a horizontal sectional view on the line 13—13 of FIG. 12 to show details of construction and cooperation of the parts, the scale being the same as FIG. 11;

FIG. 14 is a vertical sectional view through a modified form of third lens blank holding tool; and FIG. 15 is a vertical sectional view through a lens diameter punch to size the lens and remove the orientation flange therefrom.

In FIG. 1, I show a typical lens blank B which is formed by the use of my apparatus. As shown in FIG. 2 the lens blank B has an orientation flange 20 and a cone surface 22 which, as hereinafter will appear, are important elements of the blank. The blank itself thus comprises a truncated cone-shaped section with the flange 20 around the base of the section, and is shown and claimed per se in my copending application Serial No. 48,126 filed August 8, 1960.

The blank B may be formed as in FIG. 2 from a rod R of suitable plastic material in a lathe by means of a cutting tool 24 and a parting tool 26. The cutting tool 24 forms one surface of the flange 20 and the cone surface 22 when moved in the direction of the arrow thereon while the rod R is being rotated by the spindle of the lathe, and the parting tool 26 when moved in the direction of the arrow thereon forms the other surface of the flange 20 and cuts the completed blank B from the rod in an obvious manner.

In FIG. 3 I show a first lens blank holding tool T¹ consisting of a stem 28 and a shank 30 having a cone portion 32 to fit in a lathe spindle 34. A sleeve 38 is removably threaded on the stem 28 and the stem has an internal cone surface 36 (see FIG. 4) of the same slant as the cone surface 22 of the blank B. The cone surfaces 22 and 36 are so related that when the blank B is in position as in FIGS. 3 and 4, a slight space is left between the end 37 of the stem 28 and the flange 20. Thus, I insure that the blank B when accurately formed will have seating engagement with the cone 36 only of the stem 28. The cone surface 36 is, of course, concentric to the axis of rotation of the first holding tool T¹ since it is formed on a lathe in the usual manner so that when the blank B is seated thereagainst, as in FIG. 4, the orientation flange 20 is normal to the axis of rotation of the tool, the blank, of course, likewise having its cone surface 22 concentric to the axis of rotation of the blank itself, because of lathe-forming as in FIG. 2. Opposite surfaces of the orientation flange 20 will also be accurately normal to the axis of rotation because the blank is formed by a lathe turning operation. Thus the right-hand surface of the flange 20 in FIG. 4 is normal to the axis of rotation of the holding tool T¹ whereupon the sleeve 38 may be tightened for holding it in position with assurance that this surface will remain normal to the axis of rotation because the inner surface of a flange 40 of the sleeve 38 is likewise normal to the axis of rotation of the sleeve itself due to its having been formed in a lathe.

The base curve 48 of the lens is now cut by a cutting tool 42 held in a tool holder 44 which swings, as indicated by the arrow 42a in FIG. 4, about a vertical axis 46 to cut the base curve. The distance from the axis 46 to the cutting point of the tool is, of course, exactly the same as the required radius for the base curve 48 which is varied in the usual manner as required to correspond to the prescription for the particular lens being produced.

In FIG. 3A a modification is shown, both of the lens blank and the tool T¹ᵃ to hold it. The lens blank is indicated B' and has a flange 20ᵃ similar to the flange 20 of FIG. 2 and a projecting boss 22ᵃ suitable for holding in a split type draw-in collet 32ᵃ. The collet 32ᵃ is drawn into the tapered bore of a lathe spindle 34ᵃ in the usual manner so that the bore 32ᵇ of the collet at the same taper as the portion 22ᵃ of the lens blank B' contacts in effective diameter to securely hold the blank. The left-hand surface of the flange 20ᵃ is pressed into contact with end surface 32ᶜ of the collet 32ᵃ while drawing the collet tight. With this type of construction relatively larger diameter base curves can be cut into the blank B' without any interference as by the flange 40 of FIG. 3.

After the lens blank has the base curve 48 cut therein, the next step in the operation is to polish the base curve which is performed as illustrated in FIG. 5. The blank B, or B' as the case may be, is received in a lens blank holder 50 of rubber, neoprene or the like, so that it is frictionally held therein and the base curve is placed in contact with a polishing pad 54 on a polishing tool 52. The upper end of the holder 50 has an insert 56 provided with a cone seat 58 to receive the pointed end 60 of a vertical, reciprocably mounted pin 62. The pin 62 is usually weighted, or biased downwardly by spring pressure.

While the polishing tool 52 is rotated on a vertical axis as indicated by the arrow 64, the pin 62 is reciprocated horizontally as indicated by the arrow 66. During the polishing operation a polishing agent, such as a suspension of tannic oxide in water, is applied to the polishing pad 54 and after the desired polish for the base curve 48 has been secured, the lens blank is removed from the holder 50 and is ready to have the power curve cut thereon.

Referring to FIG. 6, a second lens blank holding tool T² is shown having a stem 70 and a shank 72 provided with a cone portion 74 and mounted in a lathe spindle 34 similar to the mounting shown in FIG. 3. The holding tool T² is also shown in FIGS. 7, 8 and 9. As best shown in FIG. 9, the stem 70 has a flat end 71 and an edge 73 which is rounded on a radius somewhat sharper than any possible base curve 48 of the lenses to be cut. Accordingly, there is a true circle of contact of the base curve 48 (which is spherical) with the stem 70. However, at this time the lens may be tilted as shown in FIG. 6.

To remove the tilt, I provide an orienting sleeve 76 telescopically slidable on the stem 70 which may now be slid in the direction of the arrow a of FIG. 6 until contact has been made with the base curve 48 of the lens blank B, while at the same time finger pressure is applied to the blank as indicated by the arrow b in FIG. 7. When contact is established, the operator is assured that there is no tilt in the lens, and further that the lens blank has its base curve centered on the axis of rotation of the tool T². Such centering is a very important consideration in the production of contact lenses, especially those with high dioptric power. Heretofore, attempts have been made to accomplish centering by using the periphery of the blank in cooperation with an internal diameter of tool, but unless these diameters are held very close the blank can shift with respect to such internal diameter. Even .0005" difference can, if the blank is shifted in one direction when in tool T¹ and in the opposite direction when in tool T², make a total of .001" shift, and in small sizes required for contact lenses this introduces considerable prism. Stock plastic rod from which the lenses are produced may, in fact, vary several thousandths of an inch in diameter and would therefore require an accurate sizing operation before use with the prior tools referred to, and the expense of that operation is eliminated by my method and apparatus which accurately locates the base curve in tool T² before the power curve is cut on the lens, as described in the following two paragraphs.

By keeping the lens in contact with the stem 70 by finger pressure b, and then moving the sleeve 76 only far enough to make contact with the orientation flange 20 of the lens blank, the operator is assured that the sleeve is properly adjusted relative to the lens blank being produced, whereupon a set screw 78 may be tightened down from the loose position shown in FIG. 6 to the lock position shown in FIG. 7.

Next, a flange-engaging sleeve 82 is screwed onto the sleeve 76 (see FIG. 8) until a flange 84 thereof contacts the orientation flange 20 of the blank B, at which time the operator knows the lens blank is properly oriented and the base curve is mechanically supported by its circle of contact with the rounded corner 73 of the stem 70. At the same time the operator is assured that the base curve is concentric to the axis of rotation of the tool T² because of the rounded edge 73 being concentric thereto so that subsequently when the cutting tool 42 in the holder 44 is used to cut the power curve 86 on the front of the lens (arrow 42ᵇ in FIG. 9), this curve will be concentric to, or in optical alignment with, the base curve 48. The lens will thereby be devoid of any prism whatsoever, or in other words the two curves of the lens are accurately centered mechanically and therefore optically centered. The curve 86, of course, is cut on a desired radius by swinging the tool holder 44 about a center 46ᵃ the distance from which to the cutting point of the tool is the desired radius for the power curve 86.

Referring to FIG. 10, a modification is shown of the second lens blank holding tool and identified generally as T²ᵃ wherein the stem 70 of FIG. 8 is modified and indicated 70ᵃ. The flange engaging sleeve 82 seats against a shoulder 82ᵃ of the stem, and the flange 84 of the sleeve 82 has the flange 20 of the blank B engaged therewith under pressure by a floating stem 70ᵇ having the same flat end 71 and rounded edge 73 of the stem 70 in FIG. 8. When the sleeve 82 is against the shoulder 82ᵃ, a slight space is left between the orientation flange 20 of the blank B and the outer end of the stem 70ᵃ.

A spring 75 bears against a collar 87 pinned as at 77 to the stem 70$^b$, thus biasing the stem toward the lens blank and the lens blank toward the flange 84. The spring 75 of course is strong enough to withstand the pressure of the cutting tool 42. The collar 87 is limited by a shoulder 79 so spaced that engagement occurs soon after the sleeve 82 is screwed away from the shoulder 82$^a$. The shoulder 79 thus limits the possible travel of the collar 76 so that it is not excessive, and the arrangement as just described is such that the lens blank B is confined between the rounded edge 73 of the stem 70$^b$ and the flange 84 engaging the orientation flange 20 of the blank. This arrangement eliminates the orientation sleeve 76 and the operation of sliding it from the FIG. 6 position to the FIG. 7 position, yet secures the desired accurate holding of the lens blank in the tool T$^{2a}$.

In FIG. 8A a modification is shown using a different stem 70$^c$ than the stem 70 of FIG. 8. The sleeves 76 and 82 are still used, also the set screw 78, but the lens blank B has the power curve 86 cut first instead of the base curve 48. The stem 70$^c$ has an internal rounded edge 73$^c$ as distinguished from the external rounded edge 73 of the stem to provide a circle of contact with the convex spherical surface 86. Thus, whether the base curve or the power curve is cut first, the desired circle of contact between the tool and a spherical surface of the lens is had—using the tool T2 of FIG. 8 in the one case and the tool T$^{2b}$ of FIG. 8A in the other case in opposition to the flange 84 of the sleeve 82 contacting the right-hand surface of the orientation flange 20 in both cases.

Next, the power curve 86 is polished for which I provide a third lens blank holding tool T$^3$ comprising a rotor 90 and a weighted flange engaging sleeve 92. The rotor 90 is mounted on a vertical shaft 94 of the polishing machine for rotation therewith, a set screw 96 being provided for locking the two together, and the sleeve 92 has a flange 93 to contact the orientation flange 20 of the lens blank B. As shown in FIGURE 13, the rotor T$^3$ is substantially square to permit ready outflow of polishing compound and comminuted plastic material removed by the polishing action from the lens blank, the rounded corners 91 accurately fitting the sleeve 92. A set screw 95 is provided to engage one of the flats of the square rotor 90 to cause simultaneous rotation of the sleeve 92 and the lens blank with the rotor.

A projection 98 is provided on the upper end of the rotor 90 having a flat end 100 similar to the flat end 71 in FIG. 9, and a rounded edge 102 similar to the rounded edge 73. Thus, the lens blank B is supported with its base curve having a circle of contact with the rounded edge 102 and the top surface of the orientation flange 20 is properly aligned with the axis of rotation of the rotor 90 through the flange 93 and the sleeve 92, the latter being accurately aligned by its bore receiving the rotor 90, as shown in FIG. 13, with a working fit across its corners.

A polishing tool 104 as shown in FIG. 12 is provided having a polishing pad 105 and an insert 106 having a cone seat 108 for the point 60 of the horizontally reciprocating pin 62 of the polishing machine in the manner described in connection with FIG. 5 so that simultaneous rotation of the rotor 90 and horizontal reciprocation of the pin 62 will produce the desired polishing action as between the pad 105, the polishing compound thereon and the power curve 86 of the lens blank.

In FIG. 14 I show a tool T$^{3a}$ which is a modification of FIG. 12. The rotor 90$a$ is driven by a gear 110 splined thereto and meshing with a pinion 112 on the shaft of a motor 114. The lens blanks B are conveyed along a table 116 by a conveyor belt 118 having spaced openings therein over which the lenses are positioned. When one of these openings coincides with the rotor 90$a$, it is elevated by a cam 120 and through the pressure of a spring 122 the lens blank is confined between the rounded edge 102 of the rotor 90$a$ and the lower race 124 of a thrust bearing which is rotated in a plane normal to the vertical axis of the rotor 90$a$. At the same time the rotor 90$a$ elevates the lens blank B into contact with the polishing tool 104. Thus, by intermittently advancing the conveyor belt 118 and elevating the rotor 90$a$ by rotation of the shaft on which the cam 120 is mounted, the lenses are automatically picked up and polished in an "assembly line" manner. A spring 121 serves to maintain a head 123 of a plunger 125 in contact with the cam 120, the plunger telescoping into the rotor 90$a$ and having a slot and pin connection 127—129 therewith for moving the rotor 90$a$ downwardly by action of the spring 121 when the lobe of the cam passes beyond the head 123.

After the lens blank B has been completed to the stage shown in FIG. 12, it requires only "sizing" and finishing of the edge. The lens blank B may be punched to size (diameter) in a special lens punch. Parts thereof are shown in FIG. 15 wherein a base 126 has a punch receiving bore 130 and a shearing edge 128. A punch 132 is adapted to coact with the edge 128 to shear a lens L from the lens blank B after the blank has been optically centered by the edge 128 contacting the power curve 86 and a slightly rounded edge 136 of a weighted lens holder 134 contacts the base curve 48 as fully explained in my co-pending application. Thus, the surplus of the blank beyond the desired lens diameter (the flange 20 and the unwanted adjacent portion of the lens) is trimmed off and may be discarded.

The unfinished edge of the lens must then be rounded, or beveled and rounded, and then polished so that it will not scratch the cornea. A method and apparatus for that purpose is disclosed in the Gilberto R. Cepero Patent No. 2,990,644, and another apparatus for that purpose is shown in my copending application, Serial No. 48,127, filed August 8, 1960.

From the foregoing specification it will be obvious that I have provided a number of tools for holding a lens blank accurately in each of the tools for various forming operations in producing a contact lens. In all instances an orientation flange of the lens blank is used in cooperation with either a cone surface or a formed spherical surface of the lens blank to accomplish the desired mechanical and therefore optical alignment of the lens blank during all of the forming operations. In my claims it is to be understood that "forming" is a generic term covering cutting, grinding or polishing of the lens surface as each of these operations is a "forming" operation for first "roughing" the desired surface and then "polishing" the same to the desired or required condition of smoothness. Some of my claims also are applicable to different tools disclosed, the stem 28 of FIG. 3, the chuck 32$a$ of FIG. 3A, the stems 70, 70$b$ and 70$c$ of FIGS. 6, 10 and 8A respectively also being "rotors" as is the tool 52 of FIG. 5 and the element 90 of FIG. 11. Furthermore, it is obvious that either the base curve 48 as in FIG. 4 or the power curve 86 as in FIG. 8A can be formed first, with assurance of proper alignment of the blank after the first curve is formed whether that curve is concave as in FIG. 8 or convex as in FIG. 8A. In both instances a true circle of contact is had (73 or 73$c$) with a spherical surface of the lens blank to effect the desired optical alignment and centering of such spherical surface with respect to rotation of the rotor and consequent accurate optical axis alignment and concentricity of the second spherical surface thereafter formed with respect to the first spherical surface.

The use of my apparatus insures maintenance of a proper optical axis for both surfaces of the lens, both as to axial alignment and tilt, and thereby absence of any prism whatsoever in the finished lens. Some changes may be made with respect to the construction and arrangement of parts of my apparatus which may be changed to some extent without departing from the real spirit and purpose of my invention. It is accordingly my intention to cover by my claims any modified forms of structure or use of mechanical equivalents which may reasonably be included within their scope.

I claim as my invention:

1. Apparatus for producing contact lenses comprising a lens blank holding tool having a rotor that has the edge of its end rounded to contact a first spherical curve of a lens blank with a true circle of contact, and an orienting element axially movable relative to said rotor and having means normal to the axis thereof to engage one surface of an orienting flange of the lens blank, said rotor end and said means cooperating to hold the lens blank axis true to the axis of rotation of said rotor while a second spherical curve is formed on said blank opposite said first spherical curve.

2. Apparatus for producing contact lenses comprising a lens blank holding tool having a rotor that has the edge of its end rounded to contact a first spherical curve of a lens blank with a true circle of contact, and an orienting element having means normal to the axis of said rotor to engage one surface of an orienting flange of the lens blank, said rotor end and said means cooperating to hold the lens blank axis true to the axis of rotation of said rotor while a second spherical curve is formed on said blank opposite said first spherical curve.

3. Apparatus for producing contact lenses comprising a lens blank holding tool having a rotor that has the edge of its end rounded to contact a spherical base curve of a lens blank with a true circle of contact, an orienting element axially movable relative to said rotor and having means normal to the axis thereof to engage one surface of an orienting flange of the lens blank, said rotor end and said means cooperating to hold the lens blank axis true to the axis of rotation of said rotor while a spherical power curve is formed on said blank opposite said base curve.

4. Apparatus for producing contact lenses comprising a lens blank holding tool having a rotor that has the edge of its end rounded to contact a first spherical curve of a lens blank with a true circle of contact, an orienting sleeve telescopically slidable on said rotor and having an end normal to the axis thereof to engage one surface of an orienting flange of the lens blank, a second sleeve telescopically slidable to engage the other surface of said orienting flange, said sleeves cooperating to hold the lens blank axis true to the axis of rotation of said rotor while a second spherical curve is formed on said blank opposite said first spherical curve.

5. Apparatus for producing contact lenses comprising a lens blank holding tool having a rotor that has the edge of its end rounded to contact a first spherical curve of a lens blank with a true circle of contact, an orienting sleeve having an end normal to the axis thereof to engage one surface of an orienting flange of the lens blank, a second sleeve telescopically slidable on said orienting sleeve to engage the other surface of said orienting flange, said sleeves cooperating to hold the lens blank axis true to the axis of rotation of said rotor while a second spherical curve is formed on said blank opposite first spherical curve.

6. Apparatus for producing contact lenses comprising a lens blank holding tool having a rotor that has the edge of its end rounded to contact a spherical base curve of a lens blank with a true circle of contact, an orienting sleeve and having an end normal to the axis thereof to engage one surface of an orienting flange of the lens blank, a second sleeve telescopically slidable to engage the other surface of said orienting flange, said sleeves cooperating to hold the lens blank axis true to the axis of rotation of said rotor while a spherical power curve is formed on said blank opposite said base curve.

7. Apparatus for producing contact lenses comprising a lens blank holding tool having a rotor, the end edge of which is rounded to contact a first spherical curve of a lens blank with a true circle of contact normal to the axis of rotation of said rotor, a holding sleeve telescopically slidable on said rotor and having a flange normal to its axis of rotation, said rotor and said flange being biased relatively toward each other to engage said first spherical curve and an orienting flange of the lens blank respectively, and thereby holding the lens blank in optical alignmen with the axis of rotation of said rotor while a second spherical curve of the lens blank is being formed opposite said first spherical curve.

8. Apparatus for producing contact lenses comprising a lens blank holding tool having a rotor, the end edge of which is rounded to contact a first spherical curve of a lens blank with a true circle of contact normal to the axis of rotation of said rotor, an axially movable sleeve having a flange normal to the axis of rotation of said rotor, said rotor and said flange being biased relatively toward each other to engage said first spherical curve and an orienting flange of the lens blank respectively, and thereby holding the lens blank in optical alignment with the axis of rotation of said rotor while a second spherical curve of the lens blank is being formed opposite said first spherical curve.

9. Apparatus for producing contact lenses comprising a lens blank holding tool having a rotor, the end edge of which is rounded to contact a spherical base curve of a lens blank with a true circle of contact normal to the axis of rotation of said rotor, a holding sleeve telescopically slidable on said rotor and having a flange normal to its axis of rotation, said rotor and said flange being biased relatively toward each other to engage said base curve and an orienting flange of the lens blank respectively, and thereby holding the lens blank in optical alignment with the axis of rotation of said rotor while forming a power curve opposite said base curve.

10. Apparatus for producing contact lenses comprising a lens blank holding tool having a rotor that has the edge of its end rounded to contact a spherical curve of the lens blank with a true circle of contact, and an orienting element axially movable relative to said rotor and having means normal to the axis thereof to engage one surface of said orienting flange, said rotor end and said means cooperating to hold the lens blank axis true to the axis of rotation of said rotor while a second spherical curve is formed on said lens blank opposite said first spherical curve, said last rotor axis being vertical and said holding sleeve being in the form of a weight imposed on the lens blank to keep its spherical surface in contact with said rotor.

References Cited in the file of this patent

UNITED STATES PATENTS

| | | |
|---|---|---|
| 1,022,761 | Stvanek | Apr. 9, 1912 |
| 1,412,170 | Dixon | Apr. 11, 1922 |
| 1,455,438 | Hill | May 15, 1923 |
| 1,683,712 | Clark | Sept. 11, 1928 |
| 2,000,768 | Lincke | May 7, 1935 |
| 2,224,168 | Tillyer et al. | Dec. 10, 1940 |
| 2,237,744 | Mullen | Apr. 8, 1941 |
| 2,301,035 | Golderer | Nov. 3, 1942 |
| 2,437,436 | Mullen | Mar. 9, 1948 |
| 2,443,895 | Day et al. | June 22, 1948 |
| 2,872,198 | Motz | Feb. 3, 1959 |
| 2,918,291 | Plantas | Dec. 22, 1959 |

FOREIGN PATENTS

| | | |
|---|---|---|
| 601,326 | Great Britain | May 4, 1948 |